United States Patent [19]

Kamiyama et al.

[11] Patent Number: 5,698,056

[45] Date of Patent: Dec. 16, 1997

[54] METHOD FOR MANUFACTURING A TUBULAR LINER BAG

[75] Inventors: Takao Kamiyama, Hiratsuka; Yasuhiro Yokoshima, Ibaraki-ken, both of Japan

[73] Assignees: Yokoshima & Company, Ibaraki-ken; Shonan Gosei-Jushi Seisakusho K.K., Kanagawa-ken, both of Japan

[21] Appl. No.: 533,041

[22] Filed: Sep. 25, 1995

[30] Foreign Application Priority Data

Feb. 13, 1995 [JP] Japan .................. 7-023645

[51] Int. Cl.⁶ ........................................ B29C 53/38
[52] U.S. Cl. .................. 156/218; 138/98; 428/36.91; 156/287; 156/294; 156/304.3; 156/308.4
[58] Field of Search ................. 493/210, 214, 493/215, 217, 294, 297, 308; 156/157, 218, 287, 294, 290, 292, 297, 304.3, 308.4; 138/97, 98; 264/36, 269, 516, 573; 428/36.9, 36.91, 58, 61

[56] References Cited

U.S. PATENT DOCUMENTS

| | | | |
|---|---|---|---|
| 2,350,132 | 5/1944 | Rohdin | 493/217 |
| 2,359,190 | 9/1944 | Avery et al. | 493/217 |
| 2,775,082 | 12/1956 | Vogt | 493/210 |
| 3,540,356 | 11/1970 | Lecomte | 493/217 |
| 3,630,798 | 12/1971 | Wicks | 493/217 |
| 3,829,340 | 8/1974 | Dembiak et al. | 156/218 |
| 4,009,063 | 2/1977 | Wood | 264/269 |
| 4,054,473 | 10/1977 | Ohnstad | 156/294 |
| 4,080,235 | 3/1978 | Mandersson | 156/308.4 |
| 4,132,578 | 1/1979 | Gell, Jr. | 156/294 |
| 4,146,661 | 3/1979 | Grandel et al. | 156/157 |
| 4,156,054 | 5/1979 | Gurewitsch | 156/304.3 |
| 4,243,453 | 1/1981 | McClintock | 156/218 |
| 4,446,181 | 5/1984 | Wood | 156/218 |
| 4,648,926 | 3/1987 | Ross et al. | 156/304.3 |
| 4,681,783 | 7/1987 | Hyodo et al. | 156/287 |
| 4,685,983 | 8/1987 | Long, Jr. | 156/294 |
| 4,690,668 | 9/1987 | Rebmann et al. | 493/210 |
| 4,709,948 | 12/1987 | Archer et al. | 156/304.3 |
| 4,722,759 | 2/1988 | Roberts et al. | 156/218 |
| 4,723,579 | 2/1988 | Hyodo et al. | 138/97 |
| 4,737,212 | 4/1988 | Emrich et al. | 156/157 |
| 4,880,035 | 11/1989 | Vetter | 138/97 |
| 4,938,820 | 7/1990 | McMills | 156/218 |
| 4,976,290 | 12/1990 | Gelin et al. | 138/98 |
| 5,009,632 | 4/1991 | Kruessel | 493/189 |
| 5,034,180 | 7/1991 | Steketee, Jr. | 156/294 |
| 5,044,405 | 9/1991 | Driver et al. | 138/98 |
| 5,049,426 | 9/1991 | Kimura et al. | 428/36.91 |
| 5,058,934 | 10/1991 | Brannon | 138/121 |
| 5,084,119 | 1/1992 | Barksdale | 156/157 |
| 5,093,171 | 3/1992 | Sheahan | 156/304.3 |

(List continued on next page.)

FOREIGN PATENT DOCUMENTS 60-242038  12/1985  Japan .

*Primary Examiner*—Joseph J. Hail, III
*Assistant Examiner*—Darren Ark
*Attorney, Agent, or Firm*—Lowe, Price, LeBlanc & Becker

[57] ABSTRACT

A method for manufacturing a liner bag used for lining used underground pipes: (i) a long tube of a rectangular resin absorbent sheet, whose outer face is hermetically coated with a plastic film, is formed with a long cavity along the entire length of its seam by attaching a first reinforcer cover strip to the inner face of the resin absorbent sheet tube across the seam by welding only the lateral long side portions thereof; (ii) a second reinforcer strip is fixed in the long cavity by welding it to the resin absorbent sheet and the first reinforcer strip in a manner such that the second reinforcer strip is trapped between the resin absorbent sheet and the first reinforcer strip at a location underneath the seam; (iii) then, a first adhesive tape is applied to the surface of the plastic film in a manner so as to cover up the entire length of the seam and a wider second adhesive tape is applied to the surface of the plastic film over the first adhesive tape, the back of the first adhesive tape having a releasing characteristic with respect to the adhesive element of the second adhesive tape; furthermore, in the case of a double-layer bag, the inner layer is pleated at two diagonal positions.

6 Claims, 5 Drawing Sheets

U.S. PATENT DOCUMENTS

| | | | |
|---|---|---|---|
| 5,139,134 | 8/1992 | Schenck | 156/304.3 |
| 5,163,481 | 11/1992 | Catallo | 264/269 |
| 5,167,901 | 12/1992 | Driver et al. | 156/287 |
| 5,169,697 | 12/1992 | Langley et al. | 156/304.3 |
| 5,186,987 | 2/1993 | Imoto et al. | 156/287 |
| 5,223,204 | 6/1993 | Endoh | 138/97 |
| 5,301,719 | 4/1994 | Bauerle | 138/98 |
| 5,320,698 | 6/1994 | Fournier et al. | 156/304.3 |
| 5,334,429 | 8/1994 | Imoto et al. | 138/98 |
| 5,349,996 | 9/1994 | McGregor | 141/314 |
| 5,356,502 | 10/1994 | Kamiyama et al. | 156/287 |
| 5,358,359 | 10/1994 | Long, Jr. | 156/294 |
| 5,374,174 | 12/1994 | Long, Jr. | 156/294 |
| 5,388,616 | 2/1995 | Müller et al. | 264/269 |
| 5,395,472 | 3/1995 | Mandich | 156/292 |
| 5,407,630 | 4/1995 | Smith | 156/294 |
| 5,447,665 | 9/1995 | Steketee, Jr. | 138/97 |
| 5,472,755 | 12/1995 | Nibling, Jr. | 156/304.3 |
| 5,477,887 | 12/1995 | Catallo | 138/97 |
| 5,486,332 | 1/1996 | Kamiyama et al. | 264/516 |
| 5,487,411 | 1/1996 | Goncalves | 138/97 |
| 5,490,964 | 2/1996 | Kamiyama et al. | 138/97 |
| 5,503,695 | 4/1996 | Imoto et al. | 156/287 |

METHOD FOR MANUFACTURING A TUBULAR LINER BAG

BACKGROUND OF THE INVENTION

1. Field of the Invention

The present invention relates to a method for manufacturing a tubular liner bag used mainly in a pipe lining method wherein the inner wall of a used pipe is repaired by being lined with the tubular liner bag.

2. Description of the Prior Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid or by an inflatable pressure bag, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

Now, in order to manufacture a tubular liner bag, it has been a common practice to first prepare a long rectangular sheet of resin absorbent material 101, whose one face is hermetically coated with an air- and water-tight plastic film 102, and this sheet is rolled up to form a tube such that the film 102 comes outside, and the long sides of the rectangular sheet thus meeting each other are connected by means of a narrow strip of tape 106, which is pasted along the connecting line over the film 102, as shown in (a) of FIG. 11; then, a strip of reinforcer tape 103 is welded along the connecting line from the inside of the tube. Or, alternately, the meeting long sides of the rectangular sheet of the resin absorbent material 101 are sewn together by means of a thread 109, and a narrow strip of tape 107 is pasted along the sewing line, as shown in (a) of FIG. 12.

Problems the Invention Seeks to Solve

However, when the tubular liner bags as formed in the manners described above, are everted and inflated in pipes by means of a fluid pressure until they are pressed against the inner walls of the pipes, the bags are strongly stretched circumferentially such that the long sides meeting at the seam are pulled away from each other. As the result, in the case of the connection of (a) of FIG. 11, since the reinforcer tape 103 is merely welded to the resin absorbent material 101 and the widths of the reinforcer tape 103 and the tape 106 are relatively small, the reinforcer tape 103 may partially fail to connect the long sides or the tape 106 may be stretched widthwise to become so thin to allow a burst, or as shown in (b) of FIG. 11, there occurs a gap between the long sides and the reinforcer tape 103 is stretched to be thinner so that the thickness of the liner bag at the seam is much reduced and this is particularly pronounced after the liquid resin is cured; and in the case of the connection of (a) of FIG. 12, since the tape 107 together with the thread 109 is stretched and a gap is formed between the long sides and the liner bag becomes partially thin at the seam especially after the cure of the liquid resin absorbed in the material 101.

When the diameter of the pipe to be repaired is relatively large, the tubular liner bag used is required to have a greater thickness, and thus the bag is usually made by laminating two sheets of resin absorbent material 210a, 210b to obtain the required thickness, as shown in FIG. 13. However, the tubular liner bag 210 is everted inside the pipe such that the resin absorbent material layer 210a which was the inner layer before the eversion turns to be the outer layer after the eversion, so that the tubular liner bag 210 before the eversion must be prepared in a manner such that the resin absorbent material layer 210a having a greater diameter is tucked inside the resin absorbent material layer 210b having a smaller diameter, as shown in FIG. 13.

Conventionally, in order the make the resin absorbent material 210a more compact it is pleated at one place, as shown in FIG. 13; however, when the tubular liner bag 210 is everted inside the pipe, the pleated portion of the resin absorbent material 210a often does not turn smoothly, and as the result, the tubular liner bag 210 is liable to have creases in its resultant outer surface, and after the hardening the creases often show in the inner surface as well.

Therefore, it is an object of the invention to provide a method for manufacturing such a tubular liner bag that is so pressure tight at the seam that it is burst-proof and that does not become partially thinner when inflated and cured.

And it is another object of the invention to provide a method for manufacturing such a tubular liner bag that does not obtain creases after it is everted and cured in the pipe to be repaired.

SUMMARY OF THE INVENTION

Means to solve the Problems

In order to solve the above problems and others, there is proposed a method for manufacturing a tubular eversive liner bag comprising steps of: (a) forming a long tube by bringing together the long sides of a rectangular resin absorbent sheet whose one face is hermetically coated with a plastic film, in a manner such that the film comes outside; (b) forming a long cavity along the entire length of the seam of the long tube at a location between, and defined by, the resin absorbent sheet and a reinforcer cover strip which is applied to the inner face of the resin absorbent sheet tube across the seam by welding only the lateral long side portions thereof; (c) fixing a reinforcer strip in the long cavity by welding it to the resin absorbent sheet and the reinforcer cover strip in a manner such that the reinforcer strip is trapped between the resin absorbent sheet and the reinforcer cover strip at a location underneath the seam; and (d) applying a first adhesive tape to the surface of the plastic film in a manner such as to cover up the entire length of the seam and a wider second adhesive tape to the surface of the plastic film over the first adhesive tape so as to cover up the first adhesive tape, the first adhesive tape being a two-layer laminated film of which the layer in contact with the second adhesive tape has a releasing characteristic with respect to the adhesive element of the second adhesive tape.

In a preferred embodiment the above-described step (b) consists of internally lining the long sides of the resin absorbent sheet with a pair of reinforcer cover half-strips, respectively, by partially welding the reinforcer cover half-strips to the long sides of the resin absorbent sheet such that only those lateral long side portions of the reinforcer cover half-strips that are remote from the seam are welded and the other lateral long side portions of the reinforcer cover half-strips are free, and such that the free long sides of the reinforcer cover half-strips meet each other over the seam, and then abutting and welding the free lateral long sides of the reinforcer cover half-strips together; and the step (c) consists of introducing the reinforcer strip into the long cavity and welding the lower face of the reinforcer strip to the reinforcer cover half-strips and the upper face of the reinforcer strip to the resin absorbent sheet.

Also, in the case of a double-layer bag, the invention proposes a method such that the inner tubular eversive liner bag is pleated at at least two positions, preferably at two diagonal positions.

Effects of the Invention

According to the invention, therefore, the abutment of the long sides of the resin absorbent sheet is reinforced with the reinforcer cover strip and the reinforcer strip and with the two adhesive tapes, and also the reinforcer cover strip and the reinforcer strip are fixed by welding so that the eversive tubular liner bag is so pressure-tight at the abutment (seam) that, even when the liner bag is inflated and the resin absorbent sheet is stretched circumferentially, the abutment withstands and the liner bag will not burst open.

Furthermore, the thickness of the liner bag at the seam is increased by means of the reinforcer cover strip and the reinforcer strip, and the adhesive tapes are not adhered to each other, so that, when the liner bag is inflated and the resin absorbent sheet is stretched circumferentially, the adhesion span of the second adhesive tape is increased, and the reduction in thickness of the liner bag at the seem caused by the stretch becomes insignificantly small, and thus the liner bag does not become partially thinner when cured.

Also, in the case of a double-layer bag, the inner liner bag is pleated at at least two positions, so that the depth of each pleat can be much smaller than that of the single pleat of the conventional inner liner bag, and thus the overall tubular liner bag everts more smoothly inside the pipe to be repaired. As the result, the tubular liner bag scarcely has creases after it is everted and cured.

The above and other objects and features of the invention will appear more fully hereinafter in the following description given in connection with the accompanying drawings and the novelty thereof pointed out in the appended claims.

BRIEF DESCRIPTION OF THE DRAWINGS

FIGS. 12a–11b show cross sections of a conventional tubular liner bag at the seam; n

EMBODIMENT

Next, an embodiment of the present invention will be described with reference to the attached drawings.

Figure 8:
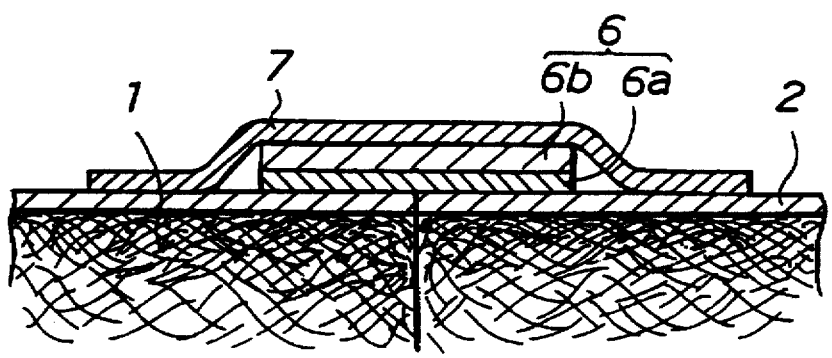
FIG. 8 is an enlarged view of the portion A of FIG. 7.
Figure 9:
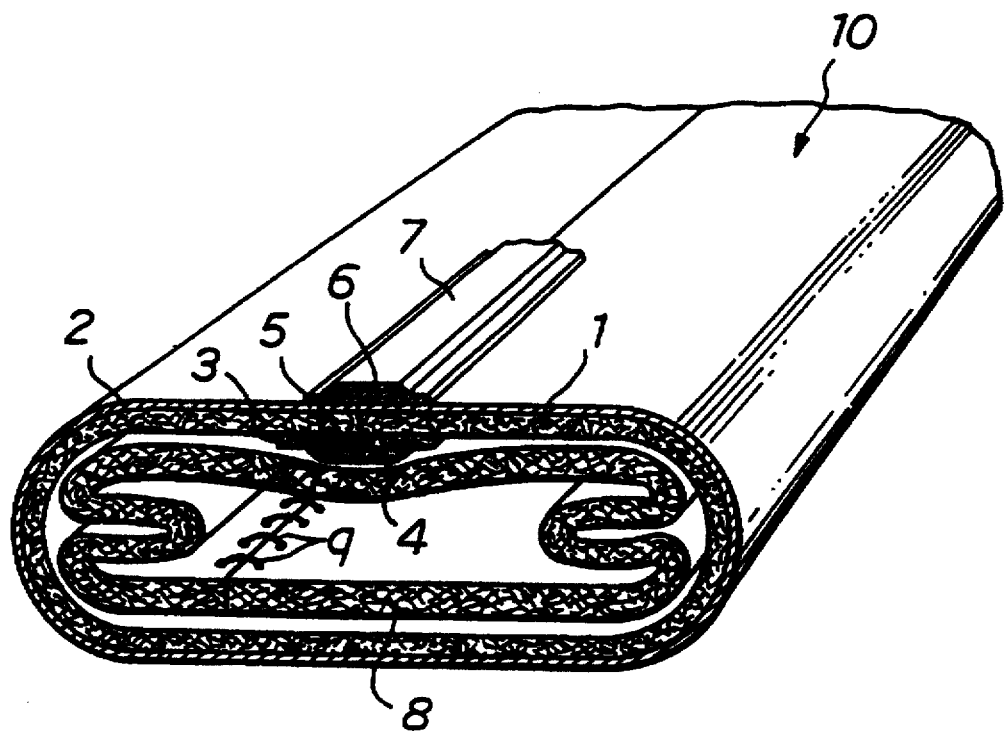
FIG. 9 is a perspective view of a part of a tubular liner bag manufactured according to the method of the invention.
Figure 10:
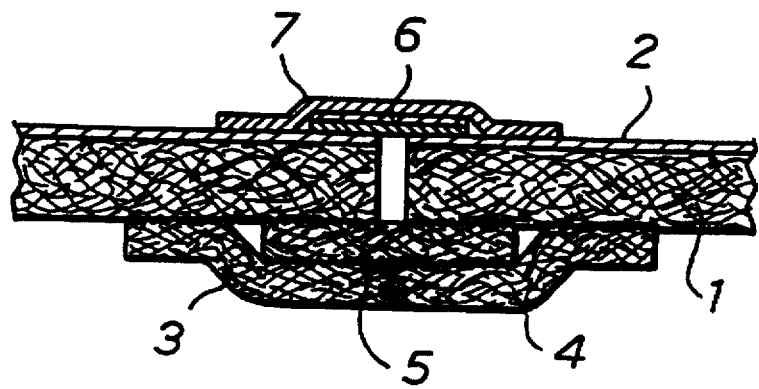
FIG. 10 is a cross section of an inventive tubular liner bag at its seam after the bag is inflated.
Figure 11A:
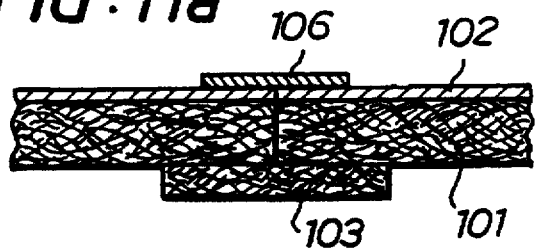
FIGS. 11a–11b show cross sections of a conventional tubular liner bag at the seam.
Figure 11B:
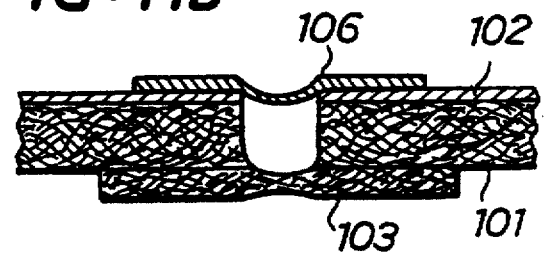
Figure 12A:
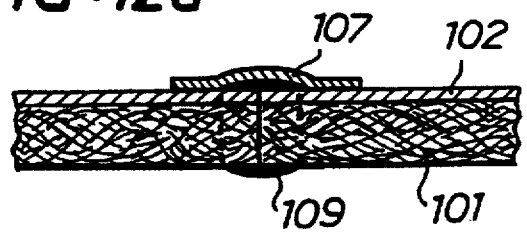
Figure 12B:
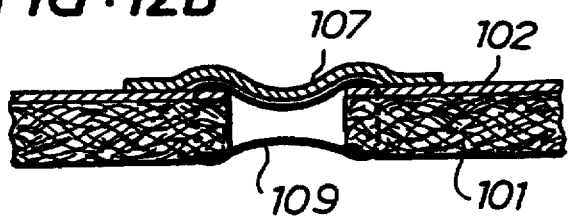

FIGS. 1 through 7 are drawings illustrating, in sequence, steps of the method of the present invention for manufacturing a tubular liner bag; FIG. 8 is an enlarged view of the portion A of FIG. 7; FIG. 9 is a perspective view of a part of a tubular liner bag; and FIG. 10 is a cross section of a tubular liner bag at its seam line after it is inflated.

Figure 1:
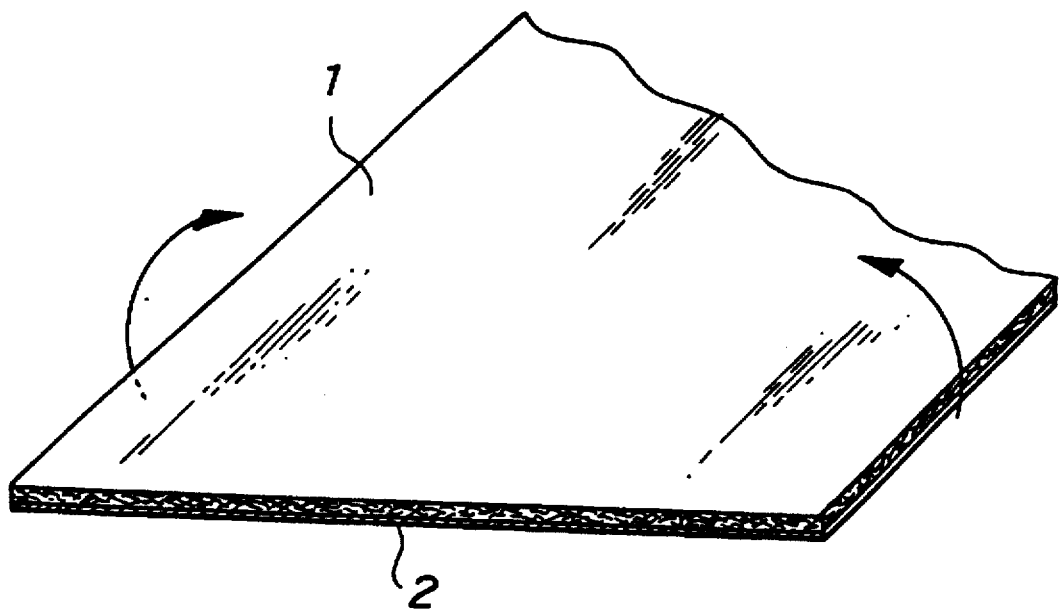
FIG. 1 is a perspective view of a part of a resin absorbent material coated with a plastic film, useful to illustrate a step of the method for manufacturing a tubular liner bag according to the invention.

In the manufacturing method of the present invention, a rectangular sheet of resin absorbent material 1 is used, which comprises a nonwoven fabric obtained by bonding or punch-pressing a mass of fiber such as of polyester, nylon, acrylic resin, polypropylene, carbon, and glass, or a mixture of some of these, and one face (the lower face, as seen in FIG. 1) of this sheet is laminated with a highly airtight plastic film 2. This plastic film may be made of polyurethane, polyvinylchloride, vinylidene, polyethylene, EVA or nylon.

Figure 2:
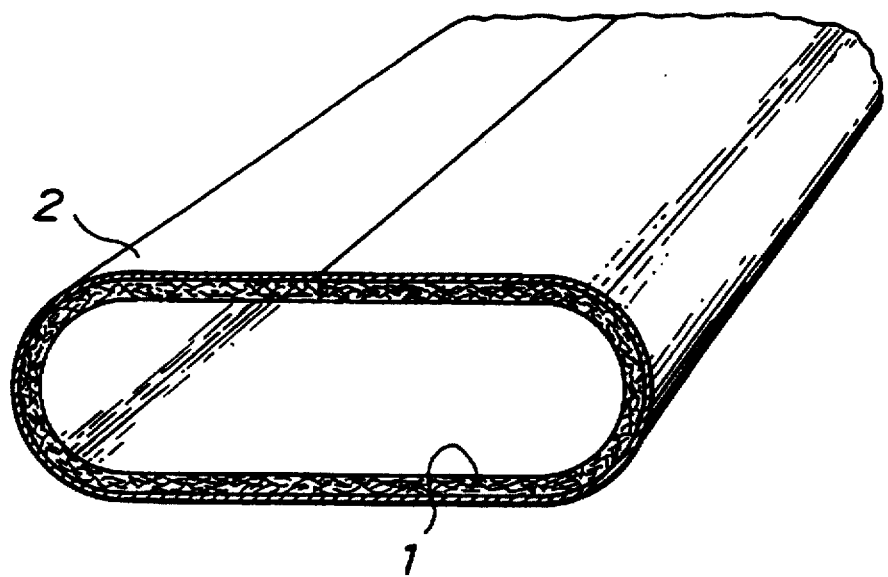
FIG. 2 is a perspective view of a part of a resin absorbent material with a plastic film after they are formed into a tube, useful to illustrate a step of the method according to the invention.

The filmed resin absorbent sheet 1 is then enfolded such that the long sides meet each other and a tube is formed, as shown in FIG. 2.

Figure 3:
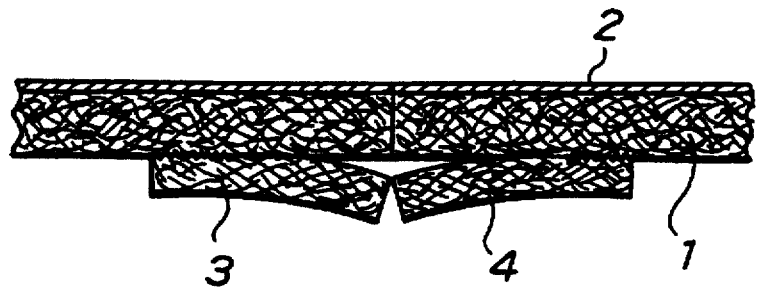
FIG. 3 is a cross section of a tubular liner bag at the seam, useful to illustrate a step of the method according to the invention.
Figure 4:
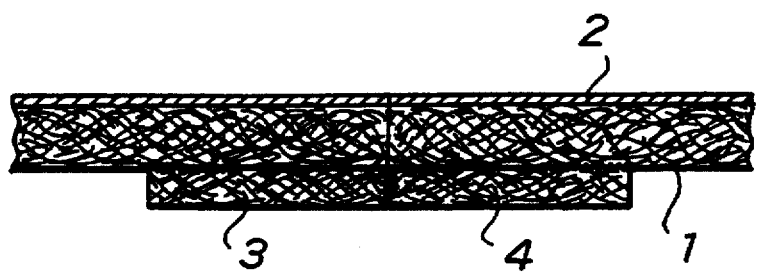
FIG. 4 is a cross section of a tubular liner bag at the seam, useful to illustrate a step of the method according to the invention.

Next, as shown in FIG. 3, the long sides of the enfolded sheet 1 are internally lined with reinforcer strips 3, 4, respectively, by partially welding the strips to the long sides such that only those side portions of the strips 3, 4 which are remote from the seam of the enfolded sheet 1 are welded and the other side portions of the strips 3, 4 are free, and such that the other sides of the strips 3, 4 meet each other over the seam of the enfolded sheet 1. Then, the free sides of the strips 3, 4 are abutted and welded together, as shown in FIG. 4.

Figure 5:
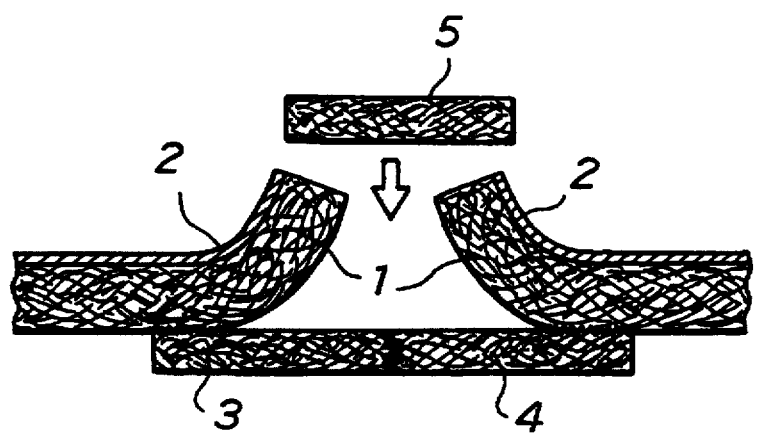
FIG. 5 is a cross section of a tubular liner bag at the seam, useful to illustrate a step of the method according to the invention.
Figure 6:
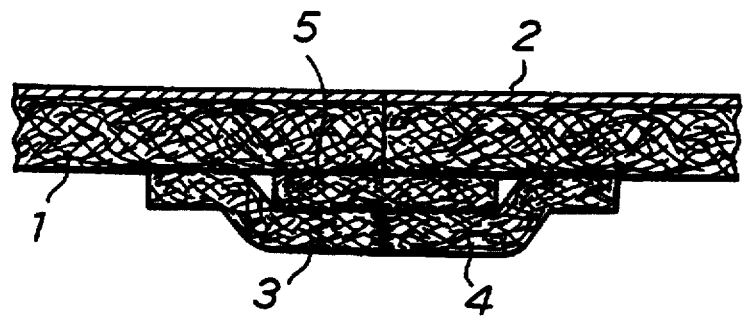
FIG. 6 is a cross section of a tubular liner bag at the seam, useful to illustrate a step of the method according to the invention.

Next, as shown in FIG. 5, the adjoining long sides of the enfolded sheet 1 are warped away from the strips 3, 4, and another reinforcer strip 5 is pressed into the space formed by the warped long sides of the sheet 1 and the strips 3, 4, and then, the lower face of the reinforcer strip 5 is welded to the reinforcer strips 3, 4 and the upper face of the strip 5 is welded to the long sides of the sheet 1, so that the reinforcer strip 5 is encased between the sheet 1 and the strips 3, 4, as shown in FIG. 6. Incidentally, the reinforcer strips 3, 4, and 5 are made of the same nonwoven fabric as the resin absorbent material 1.

Figure 7:
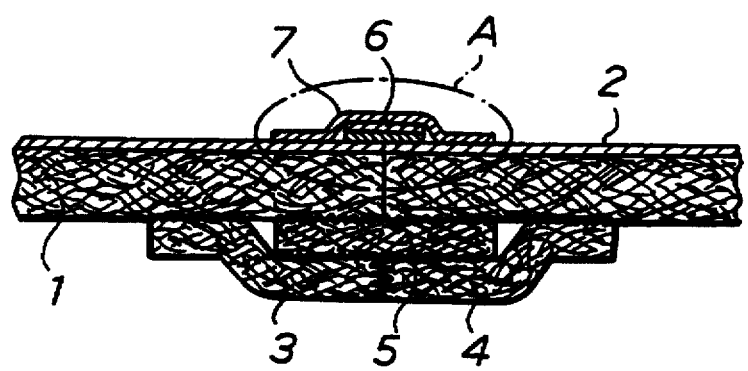
FIG. 7 is a cross section of a tubular liner bag at the seam, useful to illustrate a step of the method according to the invention.

Next, as shown in FIG. 7, an adhesive tape 6 is applied to the surface of the plastic film 2 in a manner such as to cover up the entire length of the seam line; then a wider adhesive tape 7 is pasted to the surface of the plastic film 2 over the tape 6 so as to cover up the latter 6. Incidentally, the tape 7 is a film made of the same material as the plastic film 2, and the tape 6 is a two-layer laminated film, the lower layer 6a, as seen in FIG. 8, being a film made of the same material as the tape 7 and the upper layer 6b being a film made of a material different from the material of the layer 6a or a cloth, and either way, the upper layer 6b has a releasing characteristic so that the tapes 6 and 7 are not sticking together but are easily releasable from each other.

After one end of this tube is closed the outer tubular layer of the tubular liner bag 10, shown in FIG. 9, is obtained. In this tubular liner bag 10 of the present invention, another tubular layer 8 having a diameter greater than that of the outer tubular layer is pleated at two diagonal positions and inserted in this outer tubular layer. Incidentally, the material of the tubular layer 8 is the same as that of the resin absorbent material 1, and is made tubular from the sheet form beforehand by stitching the abutting edges (long sides) of the sheet together with a thread 9.

The tubular liner bag 10, as fabricated in the above-described manner, is everted into a pipe to line the same after soaking the resin absorbent materials 1 and 8 with a hardenable liquid resin such as a thermosetting resin and a photosetting resin. In making the tubular liner bag 10, the abutment of the long sides of the resin absorbent material sheet 1 is reinforced with the three reinforcer strips 3, 4, and 5 and with the two tapes 6 and 7, and also the reinforcer strips 3, 4, and 5 are fixed by welding so that the tubular liner bag 10 is so pressure tight at the abutment (seam) that, even when the bag 10 is inflated and the resin absorbent material layer 1 is stretched circumferentially, the abutment withstands and the liner bag 10 will not burst open.

Furthermore, the thickness of the outer tubular layer of the liner bag 10 at the seam is increased by means of the reinforcer strips 3, 4, and 5, and the tapes 6 and 7 are not adhered to each other, so that, when the bag 10 is inflated and the resin absorbent material layer 1 is stretched circumferentially, the adhesion span of the tape 7 is increased, as shown in FIG. 10, and the reduction in thickness caused by the stretch becomes insignificantly small, and the liner bag 10 does not become partially thinner when cured.

Figure 13:
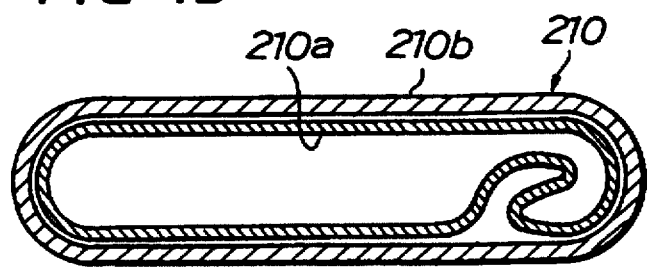
FIG. 13 is a cross section of a conventional tubular liner bag.

Also, according to the present embodiment, the resin absorbent inner layer 8 (outer layer after eversion) is pleated at two diagonal positions, so that the depth of each pleat can be much smaller than that of the single pleat of the conventional resin absorbent inner layer 210a (FIG. 13), and thus the tubular liner bag 10 (FIG. 9) everts more smoothly inside a pipe. As the result, the tubular liner bag 10 scarcely has creases after it is everted and cured in the pipe to be repaired.

While the invention has been described in its preferred embodiment, it is to be understood that modifications will occur to those skilled in the art without departing from the spirit of the invention. The scope of the invention is therefore to be determined solely by the appended claims.

What is claimed is:

1. A method of manufacturing a tubular liner bag, which method comprises: forming a long tube by abutting long sides of a rectangular resin absorbent sheet having one face hermetically coated with a plastic film to form an elongated seam, with the film on the outer surface of the long tube; applying a first reinforcer strip to an inner face of said resin absorbent sheet tube across the seam and welding only lateral side portions of the first reinforcer strip, thereby forming an elongated cavity along the entire length of the seam between, and defined by, said resin absorbent sheet and said first reinforcer strip; welding a second reinforcer strip in the long cavity to the resin absorbent sheet and the first reinforcer strip such that said second reinforcer strip is sandwiched between said resin absorbent sheet and the first reinforcer strip under the seam; applying a first adhesive tape to the surface of the plastic film to cover the entire length of the seam; and applying a second adhesive tape, wider than the first adhesive tape, to the surface of the plastic film over said first adhesive tape to cover said first adhesive tape, wherein said first adhesive tape comprises a two-layer laminated film of which a layer in contact with said second adhesive tape is releasable from the second adhesive tape.

2. The method according to claim 1, wherein the step of applying the first reinforcer strip comprises internally lining the long sides of said resin absorbent sheet with a pair of reinforcer half-strips; and the welding step for the first reinforcer strip is carried out by welding lateral long side portions of said reinforcer half-strips that are remote from said seam leaving the other lateral long side portions of the reinforcer half-strips free, such that said free long sides of the reinforcer half-strips abut along the seam; and welding the abutting free lateral long sides of the reinforcer half-strips together to form the first reinforcer strip; and wherein the step of welding a second reinforcer strip comprises introducing said second reinforcer strip into the long cavity and welding the lower face of said second reinforcer strip to the first reinforcer strip and welding the upper face of said second reinforcer strip to the resin absorbent sheet.

3. The method according to claim 2, including positioning an inner tubular liner pleated at at least two positions within said long tube.

4. The method according to claim 3, including pleating said pleated liner at two diagonal positions.

5. A tubular liner bag made by the method of claim 2.

6. A tubular liner bag made by the method of claim 4.

* * * * *